United States Patent [19]

Jaggers et al.

[11] 3,923,700
[45] Dec. 2, 1975

[54] OLIGOMERIC TITANATE OR ZIRCONATE ESTER PERFUME COMPOSITIONS

[75] Inventors: Brian George Jaggers, Hillsdale, N.J.; Keith Frederick Ufton, Ilford; Horst Richard Wagner, Ongar, both of England

[73] Assignee: Bush Boake Allen Limited, London, England

[22] Filed: Feb. 5, 1974

[21] Appl. No.: 439,926

Related U.S. Application Data

[62] Division of Ser. No. 158,049, June 29, 1971, Pat. No. 3,849,326.

[30] Foreign Application Priority Data

July 1, 1970 United Kingdom............... 31863/70

[52] U.S. Cl. ............................................... 252/522
[51] Int. Cl.² ...................... A61K 7/00; C11B 9/00
[58] Field of Search ...................................... 252/522

[56] References Cited
UNITED STATES PATENTS
3,353,542  11/1967  Kilburn ............................. 252/522

OTHER PUBLICATIONS
Jellinek, The Pract. of Mod. Perf., Interscience Pub. N.Y., 1954, pp. 63,64,73,84,85.

Moncrieff, The Chem. of Perf. Materials, United Trade Press, Ltd., London, 1949, pp. 108, 135-6, 223-7, 234-6.

*Primary Examiner*—Veronica O'Keefe
*Attorney, Agent, or Firm*—Flynn & Frishauf

[57] ABSTRACT

A compounded perfumery composition comprising a plurality of odoriferous ingredients and at least one oligomeric titanate or zirconate ester of perfumery alcohols or phenols of formula

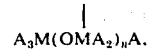

where M is titanium or zirconium, $n$ is an integer and the groups A are the same or different organic groups at least one of which has the formula [—O—R], R being the residue of a perfumery alcohol or phenol. Said oligomeric esters are prepared by hydrolysis of a monomeric ester of formula $MA_4$ with from 50 to 90 moles per 100 moles monomeric ester.

19 Claims, No Drawings

OLIGOMERIC TITANATE OR ZIRCONATE ESTER PERFUME COMPOSITIONS

This application is a divisional application of our application Ser. No. 158,049 filed June 29, 1971 now U.S. Pat. No. 3,849,326 issued Nov. 19, 1974.

This invention relates to solid washing compositions normally used or intended for use in hot or warm water such as soaps, bath salts, solid water-softeners, and solid detergent compositions. Such compositions are commonly perfumed. However, many perfumery chemicals have high volatility and are rapidly given off over an initial period of use. There is therefore a definite practical limitation on the range of perfumery materials which can usefully be added to these compositions.

The present invention provides a novel and elegant means of overcoming this difficulty in the case of perfumery alcohols and phenols by the use in solid washing compositions of an oligomeric titanate or zirconate ester of a perfumery alcohol or phenol. Accordingly the present invention provides solid washing compositions comprising a mixture of oligomeric titanate or zirconate esters of perfumery alcohols or phenols. These esters are believed to have the general formula

$$A_3M(OMA_2)_nA,$$

where $n$ is an integer and M is titanium or zirconium and the groups A are the same or different organic groups at least one of which has the formula [—OR], where R is the residue of a perfumery alcohol or phenol. The mixtures are characterised by their method of formation which involves the hydrolysis of a monomeric titanate ester $MA_4$ with a predetermined quantity of water as hereinafter described. These mixtures of oligomeric esters are themselves novel and constitute a further aspect of the invention.

Such oligomers have a very low volatility and so may be retained in solid washing compositions almost indefinitely until use. On coming into contact with water they begin to hydrolyse at a rate depending upon the temperature and quantity of the water the pH and the nature of the oligomer, i.e., upon its degree of oligomerisation and the identities of the group or groups A. Some oligomers may hydrolyse rapidly in cold water, others may require hot or boiling water or even superheated steam for hydrolysis to proceed at an appreciable rate. The invention therefore provides a broad range of washing compositions, having a multiplicity of available odours which may be induced to come off under various possible conditions of use. The majority of the oligomeric mixtures are also solids which makes for ease of incorporability into washing compositions.

Also by incorporating into a washing composition a plurality of types of mixed oligomeric titanate or zirconate esters having different rates of hydrolysis it is possible to ensure that perfume is liberated throughout two or more distinct stages of a washing procedure operating at different temperatures, for example with detergents during both the washing stage and the subsequent ironing of the washed article. The same effect can also be achieved using a single type of mixed oligomeric ester comprising two or more perfumery alcohol or phenol residues which have different susceptibilities to hydrolysis.

Mixtures of titanium oligomers are preferred over zirconium mixtures as being cheaper. The preferred mixtures are those obtained by hydrolysis of 100 moles of monomeric titanium or zirconium ester $MA_4$ with from 50 to 90 moles of water, preferably 50 to 80 parts of water. Most preferred oligomeric mixtures are those obtained by hydrolysis of 100 moles monomer with from 50 to 60 moles water.

The perfumery alcohol or phenol may be any odoriferous mono or polyhydric alcohol or phenol used or suggested for use in perfumery compositions, for example such as described in the books "Synthetic Perfumes" by West, Stausz and Barton, published by Arnold & Co. (London) 1969, "Soap, Perfumery and Cosmetics," 7th Edition by W. A. Poucher, published by Chapman & Hall (London), 1959 and "Perfume and Flavour Chemicals" by Steffen Arctander, published by the author (Montclair) 1969.

In particular, possible such compounds include linalol; β-phenyl ethyl alcohol; benzyl alcohol; menthol; n hexanol; α-terpineol; eugenol; cis-hex-3-en-1-ol; n nonanol; citronellol; n-decanol; geraniol; nerol; myrcenol; dihydrocitronellol; dihydrolinalol; dihydrogeraniol; isoborneol; pelargol or 2,6-dimethyloctan-8-ol; farnesol; dihydrofarnesol; nerolidol; -phenyl-n-propyl alcohol; γ-phenyl-n-butyl alcohol; ε-phenyl-n-amyl alcohol; cinnamyl alcohol; phenylethylene glycol; anisyl alcohol; odoriferous carbinols such as dimethylbenzyl carbinol; phenylethyldimethyl carbinol; methylphenyl carbinol; dimethylphenylcarbinol; trichloromethyl phenylcarbinol, ethylbenzylcarbinol, methylbenzylcarbinol, isopropylbenzyl carbinol, ethyl n-amyl-carbinol, methyl-n-amyl-carbinol, ω-hydroxymethyllongifolene, carbinols obtainable by reaction of limonene with formaldehyde (see W.German O L S 19 37 017) such as 6 and 10 hydroxymethyl-1,8-p-methadiene, and 8-camphene carbinol (as described in West German O L S 19 36 209) 2-hydroxy γ-pinene; verbenol; carveol; 2-hydroxy-6-p-menthene; 5-hydroxy-3-p-menthene; 3-hydroxy-2,5-dimethyl-1,4,6-octatriene; 6,8-dihydroxy-1-p-menthene; 1-hydroxy-2-p-menthene; 4-hydroxy-2-p-menthene; piperitol; carvitol; 3-hydroxy-1,1,2,3,-tetramethyl-4-cyclohexene; 3-hydroxy-2-methyl-6-methylene-1,7-octadiene; 1-hydroxy-2-methyl-6-methylene-2,7-octadiene; 3-hydroxy-2-6-dimethyl-1,7 octadiene and 1-hydroxy-2,6-dimethyl-2,6-octadiene oligomeric zirconate and titante esters of residues of hydrocyacids corresponding to perfumery lactones may also be used; such perfumery lactones include ambrettolide; exaltolide and dihydroambrettolide.

Mixed oligomeric phenol esters of titanates and zirconates which may be used in the compositions of the invention include those of vanillin; eugenol; ethylvanillin; homovanillin; isoeugenol; methyl-iso-eugenol; benzyl-iso-eugenol; thymol and p-tert-butylphenol.

It is preferred that at least two, and most preferably all groups A in the oligomers used should be perfumery alcohol or phenol residues OR, groups A which are other than OR groups may be any organic groups which do not impair the qualities of the perfume for example non-perfumery alkyl or acyl groups. Where two groups A are to be non-perfumery groups they may also be comprised in the same molecule of a difunctional compound such as a diol, a hydroxy acid such as lactic acid or an alkylolamine such as triethanolamine. Such difunctional derivatives are generally less readily hydrolysed than derivatives of monofuntional organic groups. Alkylolamines and hydroxyacids also often form 6 co-ordinate compounds with titanium and zirconium which further decreases the ease of hydrolysis. Diols which may be used include hexylene glycol (2-methylpentane-2,4-diol); 2-ethylhexane-1,3-diol and hexane 1-6, diol.

The mixed titanate and zirconate oligomers for use according to the invention may be prepared by controlled hydrolysis of an appropriate monomeric orthotitanate or orthozirconate ester. These latter are obtained by known means, e.g. by reaction of titanium tetrachloride with excess alcohol or phenol. Removal of hydrogen chloride liberated by the reaction is necessary in order to effect substitution greater than disubstitution and this may be done either by conducting the reaction in the presence of metallic sodium or by passing anhydrous ammonia through the reaction mixture. After reaction unreacted alcohol or phenol may be removed from the mixture by distillation, if necessary under reduced pressure. The monomeric titanium or zirconium ester product may also be purified by distillation if desired. Mixed esters may readily be prepared from tetraesters by alcohol or phenol interchange using stoichiometric quantities of alcohol and preferably starting from the ester of the lower boiling alcohol which may be removed by distillation as the reaction proceeds. Orthotitanates or zirconates may also be reacted with carboxylic acids, hydroxycarboxylic acids or other chelating agents such as alkylolamines in similar fashion to give esters containing both perfumery and non-perfumery substituents. In all such cases reactions are conveniently conducted by concurrent removal of displaced alcohol.

The mixed oligomeric esters may be prepared by hydrolysis of the monomeric titanate or zirconate esters using from 50 to 90, more preferably 50 to 80, most preferably 50 to 60, moles water per 100 moles monomeric ester.

The hydrolysis may be effected by simply adding the predetermined quantity of water to a known quantity of a monomeric titanate or zirconate ester (MA$_4$) and subsequently recovering an oligomeric mixture from the product. Where the oligomeric mixture is a solid it will be formed in the reaction product as a precipitate which may be filtered off. Otherwise the liberated alcohol may be distilled off, preferably under reduced pressure, to leave a liquid oligomeric mixture product although it may be desirable to leave any liberated perfumery alcohol in the product to enhance its odour characteristics. Preferably the hydrolysis is carried out in the presence of an inert, water-miscible organic solvent such as dioxane.

We are uncertain of the nature of the oligomeric mixtures obtainable by any given hydrolysis. The obvious reaction scheme might be expected to be according to the equations (for hydrolysis of a monomer M(OR)$_4$:

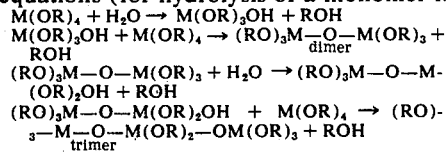

and so on. In the general case of hydrolysis of a monomer MA$_3$OR the reaction would be expected to stop at the dimer stage if the groups A were not hydrolysable. WIth a monomer M(OR)$_4$ a whole series of oligomers and polymers up to the ultimate formation of the oxide MO$_2$ would be possible. However we believe that the reactions occurring are actually far more complicated than the above scheme suggests. For example reaction of a titanium monomeric ester Ti(OR)$_4$ with water in a 2:1 molar ratio appears to yield a trimer and not a dimer as the above equations would predict. We have in fact been unable to detect any dimeric material in the reaction product.

The oligomeric mixtures used in the novel compositions will be chosen with regard to both the perfumery note desired and their ease of hydrolysis, more specifically the rate of hydrolysis at the temperature envisaged for the washing operation. Mixed oligomers which have been found particularly valuable are those comprising a residue of eugenol, terpineol, linalol, β-phenyl ethanol, citronellol, geraniol, nerol, benzyl alcohol, cinnamyl alcohol or 2-amyl cinnamyl alcohol.

Ease of hydrolysis of the mixed oligomers shows a general tendency to decrease with increasing oligomerisation, i.e., with increasing ratios of water to monomer used in the preparation reaction.

Besides the aforesaid oligomeric mixtures the novel washing compositions may contain other known perfumery compounds which do not interact with the oligomers. Normally the oligomeric mixtures will be blended with other perfumery ingredients so as to form a compounded perfumery composition which will then be admixed with other ingredients to make a novel solid washing composition. In general both the titanate and zirconate oligomers will be compatible with most of the diversity of materials known to perfumers in compounding perfumery compositions according to wellestablished principles, e.g. materials such as described in the books "Synthetic Perfumes," by West Strausz and Barton; published by Arnold and Co. (London) 1949 and "Soap, Perfumery and Cosmetics," volume II, 7th Edition, by Poucher; published by Chapman & Hall Ltd. (London), 1959, and "Perfume and Flavour Chemicals" by Steffen Arctander, published by the author (Montclair) 1969. The aforesaid books are hereby incorporated herein in their entireties.

The novel compositions may also advantageously comprise a monomeric titanate or zirconate ester of a perfumery alcohol or phenol, the use of which in washing compositions is described in our British Pat. No. 1,365,062. Such esters are monomeric titanium or zirconium compounds comprising at least one group of the formula M—OR, where M and R are as hereinbefore defined. The monomeric esters are in general more easily hydrolysed than the oligomers and will therefore often be used in conjunction with oligomers where a rapid initial release of perfume together with a slower release over a period or possibly at an elevated temperature is required.

The novel washing compositions may be any solid perfumed materials or mixtures employed as washing adjuvants and normally intended for use in warm or hot water. Such compositions include solid soaps; bath salts, which may for example variously contain sodium carbonate, sodium sesquicarbonate, sodium perborate, sodium phosphate, sodium chloride, ammonium carbonate or borax together with perfumes, colouring agents and minor amounts of other additives for modifying or retaining the physical properties; water softeners such as sodium hexametaphosphate (as sold under the trade names "Calgon" or "Metagon"), detergents which commonly comprise a surfactant material together with builders such as sodium tripolyphosphate, sodium nitrilotriacetate, sodium metasilicate and sodium pyrphosphate as well as perfumes and, possible, colouring agents and solid cleaning and/or sterilising compositions for specialised uses.

The quantities of oligomeric mixture used in the novel washing compositions may vary widely depending upon the nature of the composition and upon the characteristics of the perfume. For example detergent compositions will generally comprise from 0.02 to 1% by weight, say 0.05 to 0.5% by weight of a compounded perfumery composition whereas bath salts usually comprise from 0.1 to 10% say 0.5 to 5% by weight of a compounded perfumery composition. In the present case where the oligomeric mixture is employed as a primary ingredient of a compounded perfumery composition the latter may subsist largely or predominantly as such mixture. On the other hand oligomeric mixture may function in the compounded perfumery composition as a fixative for other odoriferous components, in which case its concentration in the composition will be relatively small. However, in the general case the mixed oligomers will represent from 1 to 98% more usually from 2 to 70% by weight of a compounded perfumery composition which will itself, in the general case, represent from 0.02 to 15% by weight of the solid washing composition, say 0.05 or 0.5 to 10%. If the solid washing composition does not comprise a compounded perfumery composition the oligomeric mixture may still be used in like quantities as indicated by the above ranges e.g. in the general case from 0.01 to 20%, more usually 0.01 to 10%, e.g. 0.01 to 5% or 0.05 to 5% or 0.05 to 10% by weight in the solid washing composition.

The novel washing compositions may be compounded in known manner, e.g. by intimate mixing of a solid oligomeric mixture with the other solid ingredients of the composition or by impregnation of the latter with a liquid oligomeric mixture or with a solution of solid oligomeric mixture in a suitable solvent which may then be evaporated. Alternatively in the case of detergents it may be possible to spray a liquid oligomeric mixture or an oligomeric mixture solution onto the detergent and/or to spray mix a solid oligomeric mixture into the composition at a later stage.

In most cases however the washing compositions will be manufactured by mixing the solid ingredients with a liquid compounded perfumery composition comprising one or more oligomeric mixtures. A particularly preferred type of novel solid detergent composition comprises at least one oligomeric mixed titanate or zirconate ester as aforesaid which is hydrolysable below 100°C and at least one other such mixture hydrolysable above 100°C. Alternatively an oligomeric mixture which is partially hydrolysable below 100°C and also hydrolysable above this temperature can be employed in this way. Compositions thus formulated may be designed to give rise to a perfumery odour throughout both the washing and the subsequent ironing stages of a laundering by the respective hydrolyses in each stage.

The invention is illustrated by the following Examples wherein Example I describes the preparation of mixture of oligomeric titanate esters and Examples II and III describe novel solid washing compositions. All parts are by weight.

EXAMPLE I

Tetra eugenyl orthotitanate was first prepared from 74g. tetra n-butyl orthotitanate and 144g eugenol by the following procedure using a three-necked 250ml flask fitted with thermometer and distillation unit.

To the 74g of tetra n-butyl orthotitanate in the dry 250ml flask 144g of eugenol were added. The pressure in the distillation system was 20mms Hg; the contents of the flask were heated and n-butanol was given off and collected as distillate. When the pot temperature reached 120°C the pressure in the system was cautiously reduced to 5mms Hg and more butanol was collected. The temperature fell and rose again to 120°C. A pressure of 0.1mm Hg was applied until no more butanol was distilled. The theoretical amount of butanol was collected, (65g). 153g of tetra-eugenyl orthotitanate was obtained as a dark red extremely viscous liquid.

An oligomeric mixture of titanate esters was obtained from the orthotitanate by addition to the latter of 50 moles water per 100 moles monomeric titanate ester.

Thus 0.18g of $H_2O$ were added to 7g tetra eugenyl orthotitanate in a stoppered flask which was then vigorously shaken and stood overnight. A bright orange solid was formed which was filtered off.

Oligomers of citronellyl linolyl and β-phenylethyl orthotitanates were prepared by precisely analogous procedures. In all cases the products were solid.

EXAMPLE II

A spray-dried solid domestic detergent powder comprising 0.2% of a standard rose-type perfumery foundation was taken as a base. This detergent comprised approximately 35% sodium tripolyphostate, 22% sodium perborate, 18% sodium dodecyl benzene sulphonate, 12% sodium sulphate together with small quantities of an alkanolamide on ethylene diamine tetra-acetric acid, sodium carboxymethyl cellulose and optical brightners.

To this rose-perfumed detergent was added a mixture titanate oligomers prepared as described in Example I, the mixture comprising 500 parts β-phenyl ethyl titanate oligomer, 400 parts citronellyl titanate oligomer and 100 parts linalyl titanate oligomer. The oligomer mixture was added in a quantity of from 25–150% of the weight of rose perfume already in the detergent.

The odour notes of the citronellol, linolol or β-phenylethanol were not appreciable in compounded detergent mixture either on standing or on its addition to cold water. However, the odours of these compounds were rapidly generated on addition of the detergent mixture to warm water.

EXAMPLE III

To a bath salt mixture comprising 800 parts sodium sesquicarbonate, 700 parts borax and 20 parts of a standard linden type perfume were added amounts of from 5 to 30 parts of the following mixture of oligomers, all prepared by procedures analogous to that of Example I.

| Terpinyl | titanate | oligomer | 500 parts |
|---|---|---|---|
| anisyl | " | " | 200 parts |
| neryl | " | " | 150 parts |
| β-phenyl ethyl | " | " | 150 parts |
| | | | 1000 |

The ingredients were thoroughly mixed and the resulting perfumed bath salts found to give off an appre-

We claim:
1. A compounded perfumery composition comprising a plurality of odoriferous ingredients and at least one compound selected from the group consisting of oligomeric compounds of the formula

$$A_3M(OMA_2)_nA,$$

wherein n is an integer, M is titanium or zirconium and the groups A are the same or different organic groups at least one of which has the formula (—OR), wherein R is the residue of a perfumery alcohol or phenol, said compound having been prepared by hydrolysis of a monomeric titanate of zirconate ester of formula $MA_4$ with from 50 to 90 moles of water per 100 moles of said monomeric ester; and said perfumery alcohol or phenol is selected from the group consisting of linalol; β-phenyl ethyl alcohol; benzyl alcohol; methanol; n-hexanol; α-terpineol; eugenol; cis-hex-3-en-1-ol; n-nonanol; citronellol; n-decanol; geraniol; nerol; myrcenol; dihydrocitronellol; dihydrolinalol; isoborneol; 2,6-dimethyloctan-8-ol; farnesol; dihydrofarnesol; nerolidol; γ-phenyl-n-propyl alcohol; γ-phenyl-n-butyl alcohol; Σ-phenyl-n-amyl alcohol; cinnamyl alcohol; 2-amyl-cinnamyl alcohol phenylethylene glycol; anisyl alcohol; dimethylbenzyl carbinol; phenylethyldimethyl carbinol; methylphenyl carbinol; dimethylphenyl carbinol; trichloromethyl phenylcarbinol; ethylbenzylcarbinol; methylbenzylcarbinol; isopropylbenzyl carbinol; ethyl-n-amylcarbinol; methyl-n-amyl carbinol; ω-hydroxymethyllogifolene; 6-and 10-hydroxymethyl-1 8-p-methadiane; Σ-camphena carbinol; 2-hydroxy-γ-pinane; verbenol; carveol; 2-hydroxy-6-p-menthene; 5-hydroxy-3-p-menthene; 3-hydroxy-2,5-dimethyl-1,4,6-octatriene; 6,8-dihydroxy-1-p-menthene; 1-hydroxy-2-p-menthene; 4-hydroxy-2-p-menthene; piperitol, carvitol; 3-hydroxy-1,1,2,3-tetramethyl-4-cyclohexane; 3-hydroxy-2-methyl-6-methylene-1,7-octadiene; 1-hydroxy-2-emthyl-6-methylene-2,7-octadiene; 3-hydroxy-2-dimethyl-1,7-octadiene; 1-hydroxy-2-,6-dimethyl-2,6,octadiene; ambrettolide; exaltolide; dihydroambrettolide; vanillin; eugenol; ethylvanillin; homovanillin; isoeugenol; methyl-iso-eugenol; benzyl-iso-eugenol; thymol and p-tert-butylphenol.

2. The composition of claim 1 wherein $MA_4$ is $M(OR)_4$, and wherein said composition comprises a mixture of at least two compounds selected from said group of oligomeric compounds.

3. The composition of claim 2 wherein said oligomeric compounds have been prepared by hydrolysis of said esters of the formula $M(OR)_4$ with from 50 to 80 moles of water per 100 moles of said esters.

4. The composition of claim 3 wherein said mixture of oligomeric compounds comprises from 1 to 98% by weight of said compounded perfumery composition.

5. The composition of claim 4 wherein said mixture of oligomeric compounds comprises from 2 to 70% by weight of said compounded perfumery composition.

6. The composition of claim 5 wherein said perfumery alcohol or phenol is selected from the group consisting of eugenol, geraniol, nerol, benzyl alcohol, cinnamyl alcohol, and 2-amyl cinnamyl alcohol.

7. The composition of claim 2 wherein said perfumery alcohol or phenol is selected from the group consisting of eugenol, geraniol, nerol, benzyl alcohol, cinnamyl alcohol, and 2-amyl cinnamyl alcohol.

8. The composition of claim 7 wherein said oligomeric compounds have been prepared by hydrolysis of said esters of the formula $M(OR)_4$ with from 50 to 60 moles of water per 100 moles of said esters.

9. The composition of claim 8 wherein said mixture of oligomeric compounds comprises from 2 to 70% by weight of said compounded perfumery composition.

10. The composition of claim 2 wherein said at least one compound selected from said group consisting of said oligomeric compounds comprises from 1 to 98% by weight of said compounded perfumery composition.

11. The composition of claim 10 wherein at least two groups A are comprised in a single molecule of a difunctional compound.

12. The composition of claim 11 wherein said difunctional compound is selected from the group consisting of a diol, a hydroxy acid, and an alkylolamine.

13. A compounded perfumery composition comprising a plurality of odoriferous ingredients and at least one compound selected from the group consisting of oligomeric compounds of the formula $$(RO)_3Ti(OTi(OR)_2)_nOR,$$

wherein n is an integer, and the groups OR are the same or different residues of a perfumery alcohol or phenol, said compound having been prepared by hydrolysis of monomeric titanate ester of the formula $Ti(OR)_4$ with from 50 to 90 moles of water per 100 moles of said monomeric titanate ester, said perfumery alcohol or phenol being selected from the group consisting of linalol; β-phenyl ethyl alcohol; benzyl alcohol; menthol; n-hexanol; α-terpineol; eugenol; cis-hex-3-en-1-ol; n-nonahol; citronellol; n-decanol; geraniol; nerol; myrcenol; dihydrocitronellol; dihydrolinalol; dihydrogeraniol; isoborneol; 2,6-dimethyl-octan-8-ol; farnesol; dihydrofarnesol; nerolidol; γ-pehnyl-n-propyl alcohol; γ-phenyl-n-butyl alcohol; Σ-phenyl-n-amyl alcohol; cinnamyl alcohol; 2-amyl cinnamyl alcohol phenylethylene glycol; anisyl alcohol; dimethylbenzyl carbinol; phenylethyldimethyl carbinol; methylphenyl carbinol; dimethylphenyl carbinol; trichloromethyl phenylcarbinol; ethylbenzylcarbinol; methylbenzylcarbinol; isopropylbenzyl carbinol; ethyl-n-amylcarbinol; methyl-n-amylcarbinol; ω-hydroxymethyllongifolene; 6-and 10-hydroxymethyl-1,8-p-methadiene; Σ-camphene carbinol; 2-hydroxy-γ-pinane; verbenol; carveol; 2-hydroxy-6-p-menthene; 5-hydroxy-3-p-menthene; 3-hydroxy12,5-dimethyl-1,4,6-octatriene; 6,8-dihydroxy-1-p-menthene; 1-hydroxy-2-p-menthene; 4-hydroxy-2-p-menthene; piperitol; carvitol; 3-hydroxy-1,1,2,3-tetramethyl-4-cyclohexene; 3-hydroxy-2-methyl-6-methylene-1,7-octadiene; 1-hydroxy-2-methyl- 6-methylene-2,7-octadiene; 3-hydroxy-2-dimethyl-1,7-octadiene; 1-hydroxy-2,6,-dimethyl-2,6-octadiene; ambrettolide; exaltolide; dihydroambrettolide, vanillin; eugenol; ethylvanillin; homovanillin; isoeugenol; methyl-isoeugenol; benzyl-iso-eugenol; thymol and p-tert-butylphenol.

14. The composition of claim 13 wherein said composition comprises a mixture of at least two compounds selected from said group of oligomeric compounds and wherein said mixture comprises from 1 to 98% by weight of said compounded perfumery composition.

15. The composition of claim 14 wherein said oligomeric compounds have been prepared by hydrolysis of said titanate esters with from 50 to 80 moles of water per 100 moles of said esters.

16. The compositions of claim 15 wherein said mixture of oligomeric compounds comprises from 2 to 70% by weight of said compounded perfumery composition.

17. The composition of claim 16 wherein said perfumery alcohol or phenol is selected from the group consisting of eugenol, geraniol, nerol, benzyl alcohol, cinnamyl alcohol, and 2-amyl cinnamyl alcohol.

18. The composition of claim 17 wherein said oligomeric compounds have been prepared by hydrolysis of said titanate esters with from 50 to 60 moles of water per 100 moles of said esters.

19. The composition of claim 18 wherein said oligomeric compounds are selected from the group consisting of eugenyl titanate oligomer, citronellyl titanate oligomer, linolyl titanate oligomer, β-phenylethyl titanate oligomer, terpinyl titanate oligomer, anisyl titanate oligomer, and neryl titanate oligomer.

* * * * *

UNITED STATES PATENT AND TRADEMARK OFFICE
CERTIFICATE OF CORRECTION

PATENT NO. : 3,923,700

DATED : Dec. 2, 1975

INVENTOR(S) : BRIAN GEORGE JAGGERS, KEITH FREDERICK UFTON, and HORST RICHARD WAGNER It is certified that error appears in the above-identified patent and that said Letters Patent are hereby corrected as shown below:

In the ABSTRACT, last line, after "moles", first occurrence, insert --of water--.

Column 7, line 21, replace "methanol" with --menthol--.

Column 7, line 24, after "dihydrolinalol", insert --dihydrogeraniol--.

Column 8, line 53, replace

"3-hydroxy12,5-dimethyl-1,4,6-octatriene"

with

--3-hydroxy 2,5-dimethyl-1,4,6-octatriene--.

Signed and Sealed this eighteenth Day of May 1976

[SEAL]

Attest:

RUTH C. MASON
Attesting Officer

C. MARSHALL DANN
Commissioner of Patents and Trademarks